(12) United States Patent
Viswanatha et al.

(10) Patent No.: US 11,693,094 B2
(45) Date of Patent: Jul. 4, 2023

(54) TECHNIQUES TO COMPENSATE FOR VARIATIONS IN PHASE OVER TIME IN LIDAR SYSTEMS

(71) Applicant: AEVA, INC., Mountain View, CA (US)

(72) Inventors: Kumar Bhargav Viswanatha, Santa Clara, CA (US); Jose Krause Perin, Mountain View, CA (US); Rajendra Tushar Moorti, Mountain View, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 44 days.

(21) Appl. No.: 17/521,708

(22) Filed: Nov. 8, 2021

(65) Prior Publication Data
US 2022/0113379 A1   Apr. 14, 2022

Related U.S. Application Data

(63) Continuation of application No. 17/234,460, filed on Apr. 19, 2021, now Pat. No. 11,169,246.
(Continued)

(51) Int. Cl.
*G01S 7/48* (2006.01)
*G01S 7/481* (2006.01)
*G01S 17/34* (2020.01)

(52) U.S. Cl.
CPC .......... *G01S 7/4808* (2013.01); *G01S 7/4818* (2013.01); *G01S 17/34* (2020.01)

(58) Field of Classification Search
None
See application file for complete search history.

(56) References Cited

U.S. PATENT DOCUMENTS

| 5,082,364 A | 1/1992 | Russell |
| 9,081,090 B2 | 7/2015 | Sebastian et al. |

(Continued)

FOREIGN PATENT DOCUMENTS

WO   2016014894 A1   1/2016

OTHER PUBLICATIONS

International Search Report and Written Opinion on the Patentability of Application No. PCT/US2021/052700 dated Feb. 1, 2022, 19 pages.

*Primary Examiner* — Eric L Bolda
(74) *Attorney, Agent, or Firm* — Womble Bond Dickinson (US) LLP

(57) ABSTRACT

A method to compensate for phase impairments in a light detection and ranging (LIDAR) system includes transmitting a first optical beam towards a target, receiving a second optical beam from the target to produce a received optical beam; and generating a digitally-sampled target signal using a local oscillator (LO) beam, a first photo-detector and the received optical beam. The method also includes generating a digitally-sampled reference signal using a reference beam transmitted through a fiber delay device and a second photo-detector, and estimating one or more phase impairments in the LiDAR system using the digitally-sampled reference signal to produce one or more estimated phase impairments. The method also includes performing a first correction on a first phase impairment introduced into the digitally-sampled target signal by the LO beam; performing a second correction on a second phase impairment introduced into the digitally-sampled target signal by the received optical beam.

20 Claims, 14 Drawing Sheets

Related U.S. Application Data

(60) Provisional application No. 63/087,432, filed on Oct. 5, 2020.

(56) References Cited

U.S. PATENT DOCUMENTS

| | | |
|---|---|---|
| 10,203,401 B2 | 2/2019 | Sebastian et al. |
| 2014/0269790 A1 | 9/2014 | Sebastian et al. |
| 2018/0017671 A1 | 1/2018 | Warke et al. |
| 2018/0241477 A1 | 8/2018 | Turbide et al. |
| 2019/0339359 A1 | 11/2019 | Wang et al. |
| 2019/0353789 A1 | 11/2019 | Boloorian et al. |
| 2020/0072979 A1 | 3/2020 | Boloorian et al. |

TECHNIQUES TO COMPENSATE FOR VARIATIONS IN PHASE OVER TIME IN LIDAR SYSTEMS

RELATED APPLICATIONS

This application is a continuation of U.S. patent application Ser. No. 17/234,460, filed Apr. 19, 2021, which claims priority from and the benefit of U.S. Patent Application No. 63/087,432 filed on Oct. 5, 2020, the entire contents of which are incorporated herein by reference in their entirety.

FIELD OF INVENTION

The present disclosure is related to light detection and ranging (LIDAR) systems.

BACKGROUND

Conventional Frequency-Modulated Continuous-Wave (FMCW) LIDAR systems include several possible phase impairments such as laser phase noise, circuitry phase noise, flicker noise that the driving electronics inject on a laser, drift over temperature/weather, and chirp rate offsets. These impairments cause loss in probability of detection, increase false alarm and range/velocity bias, and increase the error in estimated target range/velocity.

SUMMARY

The present disclosure describes various embodiments of LIDAR systems and methods that, among other things, add reference channels to a system to emulate a target at a pre-determined distance, estimate phase impairments based on a reference channel, and correct signals based on an estimated phase impairment. Embodiments of the present invention include the functionality to estimate phase impairments and to compensate for them in the return signal. Such impairments include those based on, for example, laser phase noise, circuitry phase noise, flicker noise, drift over temperature or weather, chirp rate offsets, or other types of impairments that can cause a loss in probability of detection, increase false alarm, and lead to mis-estimation of range or velocity that can lead to bias in range/velocity and increased range/velocity error.

According to one aspect, the present disclosure relates to a method to correct phase impairments in a light detection and ranging (LIDAR) system. The method includes transmitting a first optical beam towards a target; receiving a second optical beam from the target to produce a received optical beam; generating a digitally-sampled target signal using a local oscillator (LO) beam, a first photo-detector and the received optical beam; and generating a digitally-sampled reference signal using a reference beam transmitted through a fiber delay device and a second photo-detector. The method also includes estimating one or more phase impairments in the LiDAR system using the digitally-sampled reference signal to produce one or more estimated phase impairments. The method also includes performing a first correction, using the one or more estimated phase impairments, on a first phase impairment from the one or more phase impairments in the digitally-sampled target signal, wherein the first phase impairment is introduced into the digitally-sampled target signal by the LO beam. The method also includes performing a second correction, using the one or more estimated phase impairments, on a second phase impairment from one or more phase impairments in the digitally-sampled target signal, wherein the second phase impairment is introduced into the digitally-sampled target signal by the received optical beam. The method also includes processing the first and second corrections to produce a corrected target signal for transmission to a point cloud. In one embodiment, estimating the one or more phase impairments includes: using at least one of a zero forcing estimator, a MMSE estimator, a maximum likelihood estimator, and a map estimator. In one embodiment, performing the first correction includes: using one or more filters shaped based at least in part on an estimation of the first phase impairment. In one embodiment, performing the second correction includes: using a brute force delayed correction filter that delays the received optical beam through a number of digital delays and selects an optimal delay. In one embodiment, selecting the optimal delay includes: performing a fast Fourier transform (FFT) of the digital delays and selecting a delay with a highest peak. In one embodiment, performing the second correction includes: using an iterative delayed correction filter that repeatedly delays the reflected optical beam through different digital delays until peak convergence is achieved. In one embodiment, performing the second correction includes: using a deskew compensation correction filter. In one embodiment, the method also includes generating a number of digitally-sampled reference signals using reference beams transmitted through multiple different fiber delay devices, and each fiber delay device is connected with a respective photo-detector.

According to another aspect, the present disclosure relates to a light detection and ranging (LIDAR) system comprising. The system includes an optical beam source to transmit a first optical beam to a target; a first detector to receive a received optical beam from the target and a local oscillator (LO) beam and generate a digitally-sampled target signal; a fiber delay device having a known length and coupled to the optical beam source; a second detector coupled to the fiber delay device to generate a digitally-sampled reference signal using a reference beam transmitted through the fiber delay device; a phase impairment estimator to estimate one or more phase impairments in the LiDAR system using the digitally-sampled reference signal to produce one or more estimated phase impairments; a first phase impairment corrector to correct for a first phase impairment introduced into the digitally-sampled target signal by the LO beam; and a second phase impairment corrector to correct for a second phase impairment introduced into the digitally-sampled target signal by the received optical beam. In one embodiment, the system also includes a zero forcing estimator, a MMSE estimator, a maximum likelihood estimator, or a map estimator to estimate the one or more phase impairments. In one embodiment, the first phase impairment corrector includes one or more filters shaped based at least in part on an estimation of the first phase impairment. In one embodiment, the second phase impairment corrector includes a brute force delayed correction filter that delays the received optical beam through a number of digital delays and selects an optimal delay. In one embodiment, selecting the optimal delay includes: performing a fast Fourier transform (FFT) of the digital delays and selecting a delay with a highest peak. In one embodiment, the second phase impairment corrector includes an iterative delayed correction filter that repeatedly delays the reflected optical beam through different digital delays until peak convergence is achieved. In one embodiment, the second phase impairment corrector includes a deskew compensation correction filter. In one embodiment, the fiber delay device generates delay proportional to a frequency of the received optical beam such that reflections from targets at a larger distance are delayed more and reflections from targets at a shorter distance are delayed less. In one embodiment, the system also includes a number of different fiber delay devices and photo-detectors to generate a number of digitally-sampled reference signals.

According to another aspect, the present disclosure relates to a method to correct phase impairments in a light detection and ranging (LIDAR) system. The method includes generating a digitally-sampled target signal using a local oscillator (LO) beam, a first photo-detector and a received optical beam reflected from a target; generating a digitally-sampled reference signal using a reference beam transmitted through a fiber delay device and a second photo-detector; estimating a first phase impairment introduced into the digitally-sampled target signal by the LO beam; estimating a second phase impairment introduced into the digitally-sampled target signal by the received optical beam; performing a first correction to correct for the first phase impairment; and performing a second correction to correct for the second phase impairment. In one embodiment, estimating the second phase impairment includes: using at least one of a zero forcing estimator, a MMSE estimator, a maximum likelihood estimator, and a map estimator. In one embodiment, performing the second correction includes: using a brute force delayed correction filter that delays the received optical beam through a plurality of digital delays and selects an optimal delay; using an iterative delayed correction filter that repeatedly delays the reflected optical beam through different digital delays until peak convergence is achieved; or using a deskew compensation correction filter.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LIDAR systems and methods to compensate for phase impairments. According to some embodiments, the described LIDAR system may be implemented in any sensing market, such as, but not limited to, transportation, manufacturing, metrology, medical, augmented reality, virtual reality, and security systems. According to some embodiments, the described LIDAR system is implemented as part of a front-end of frequency modulated continuous-wave (FMCW) device that assists with spatial awareness for automated driver assist systems, or self-driving vehicles.

Figure 1:
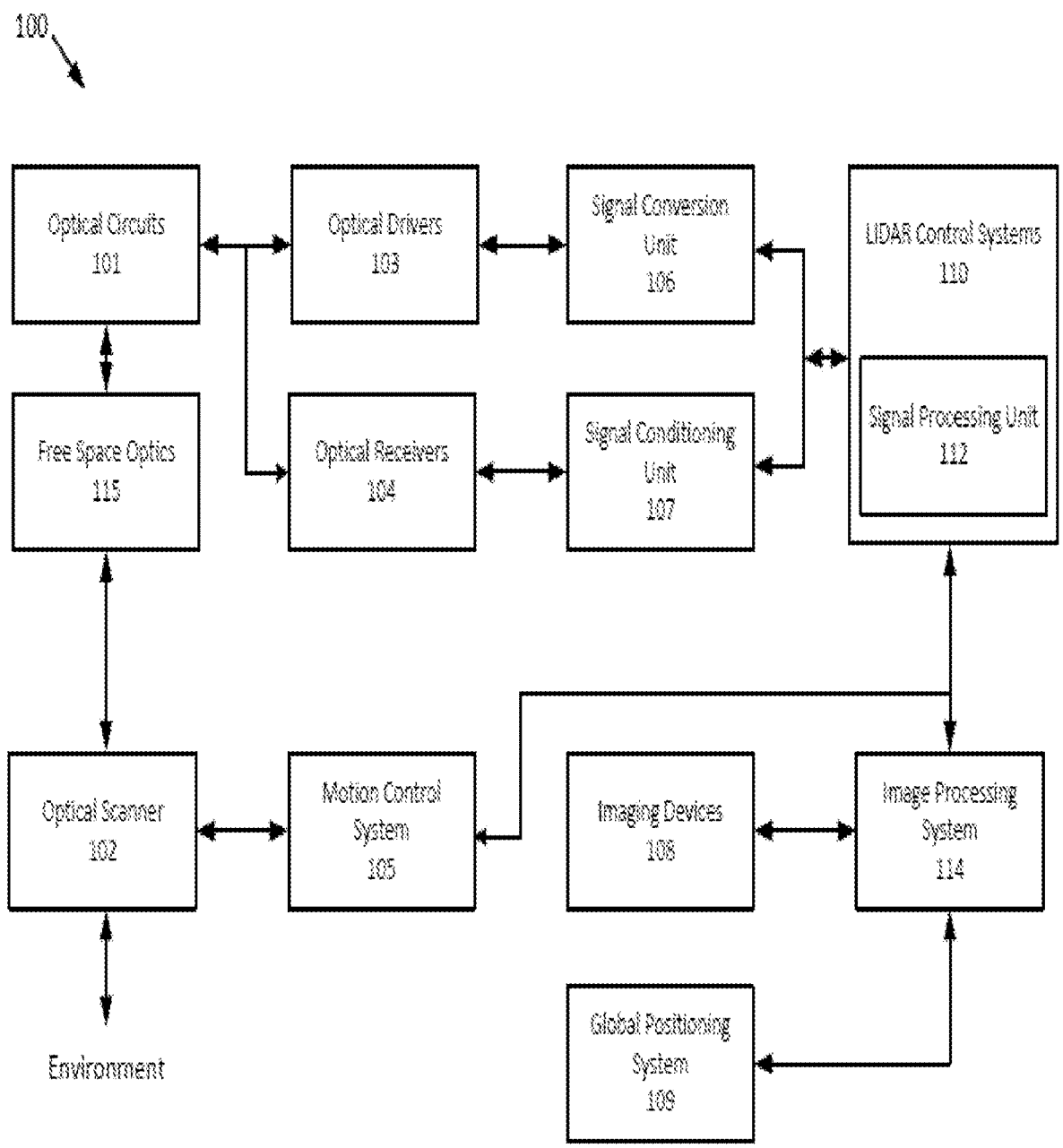
FIG. 1 illustrates an example LIDAR system according to embodiments of the present disclosure.

FIG. 1 illustrates a LIDAR system 100 according to example implementations of the present disclosure. The LIDAR system 100 includes one or more of each of a number of components, but may include fewer or additional components than shown in FIG. 1. One or more of the components depicted in FIG. 1 can be implemented on a photonics chip, according to some embodiments. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the return signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points.

The signal processing unit 112 can also overlay a 3D point cloud data with the image data to determine velocity and distance of objects in the surrounding area. The system also processes the satellite-based navigation location data to provide a precise global location.

Figure 2:
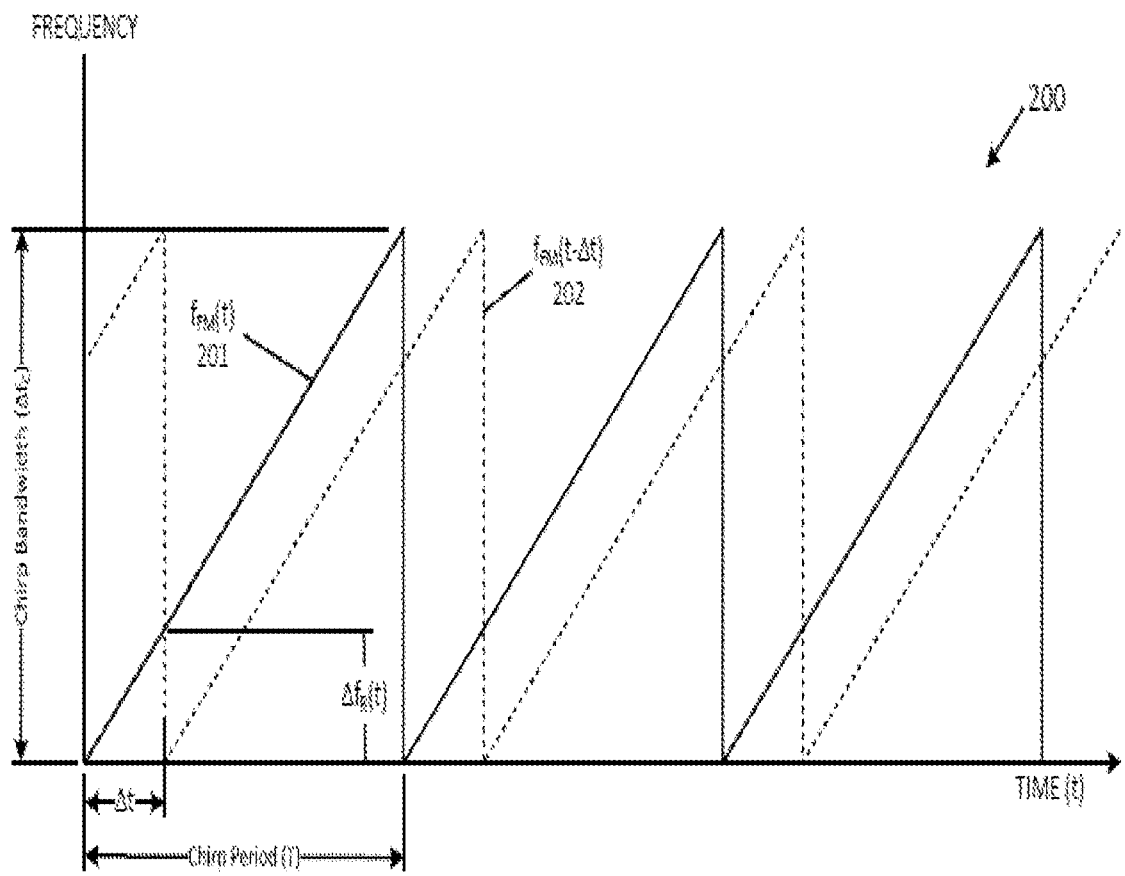
FIG. 2 is a time-frequency diagram illustrating how LIDAR waveforms are detected and processed according to embodiments of the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as fFM(t), is a sawtooth waveform (sawtooth "chirp") with a chirp bandwidth ΔfC and a chirp period TC. The slope of the sawtooth is given as k=(ΔfC/TC). FIG. 2 also depicts target return signal 202 according to some embodiments. Target return signal 202, labeled as fFM(t−Δt), is a time-delayed version of the scanning signal 201, where Δt is the round trip time to and from a target illuminated by scanning signal 201. The round trip time is given as Δt=2R/v, where R is the target range and v is the velocity of the optical beam, which is the speed of light c. The target range, R, can therefore be calculated as R=c(Δt/2). When the return signal 202 is optically mixed with the scanning signal, a range dependent difference frequency ("beat frequency") ΔfR(t) is generated. The beat frequency ΔfR(t) is linearly related to the time delay Δt by the slope of the sawtooth k. That is, ΔfR(t)=kΔt. Since the target range R is proportional to Δt, the target range R can be calculated as R=(c/2)(ΔfR(t)/k). That is, the range R is linearly related to the beat frequency ΔfR(t). The beat frequency ΔfR(t) can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also include a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing (ΔfRmax) is 500 megahertz. This limit in turn determines the maximum range of the system as Rmax=(c/2)(ΔfRmax/k) which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
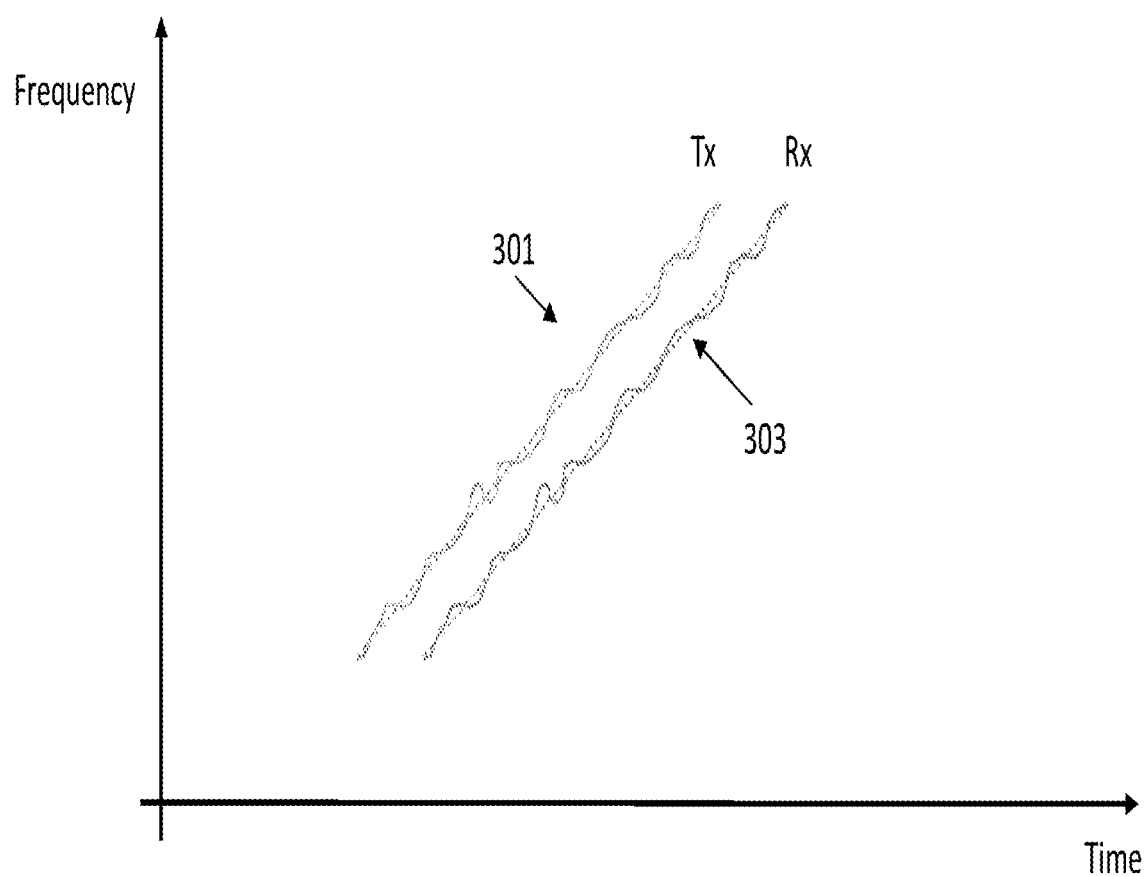
FIG. 3 illustrates various fast variations in phase that can be detected by embodiments of the present disclosure.

FIG. 3 is a graph illustrating various fast variations in phase, or phase impairments, that can be detected by embodiments of the present invention. The variations in the scanning signal Tx are shown at 301, and the variations in the return signal Rx are shown at 303, in this example embodiment. As shown in FIG. 3, among other things, variations in laser phase noises, circuitry phase noises, and flicker noises can be detected by LIDAR systems described by embodiments of the present invention using components such as those depicted in FIG. 1.

Figure 4:
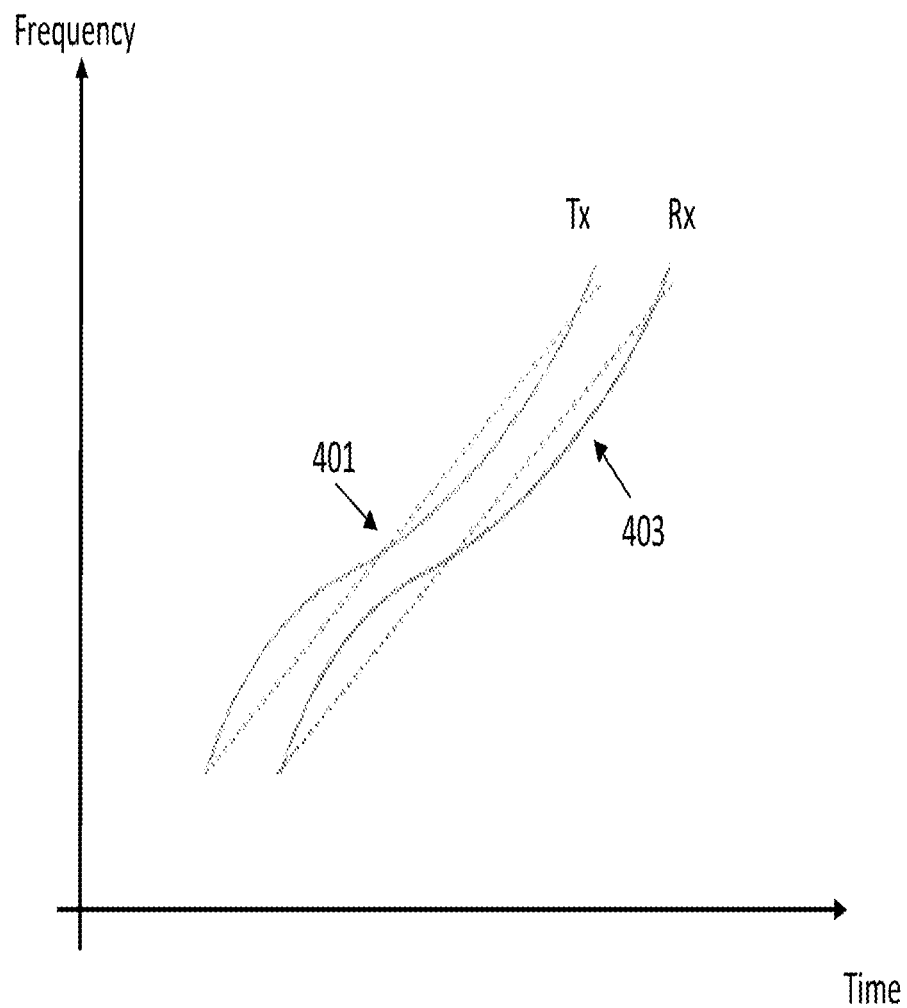
FIG. 4 illustrates various slow variations in phase that can be detected by embodiments of the present disclosure.

FIG. 4 illustrates various slow variations in phase that can be detected by embodiments of the present invention. The variations in the scanning signal Tx are shown at 401, and the variations in the return signal Rx are shown at 403, in this example embodiment. As shown in FIG. 4, among other things, variations in temperature can be detected by LIDAR systems described by embodiments of the present invention using components such as those depicted in FIG. 1.

Figure 5:
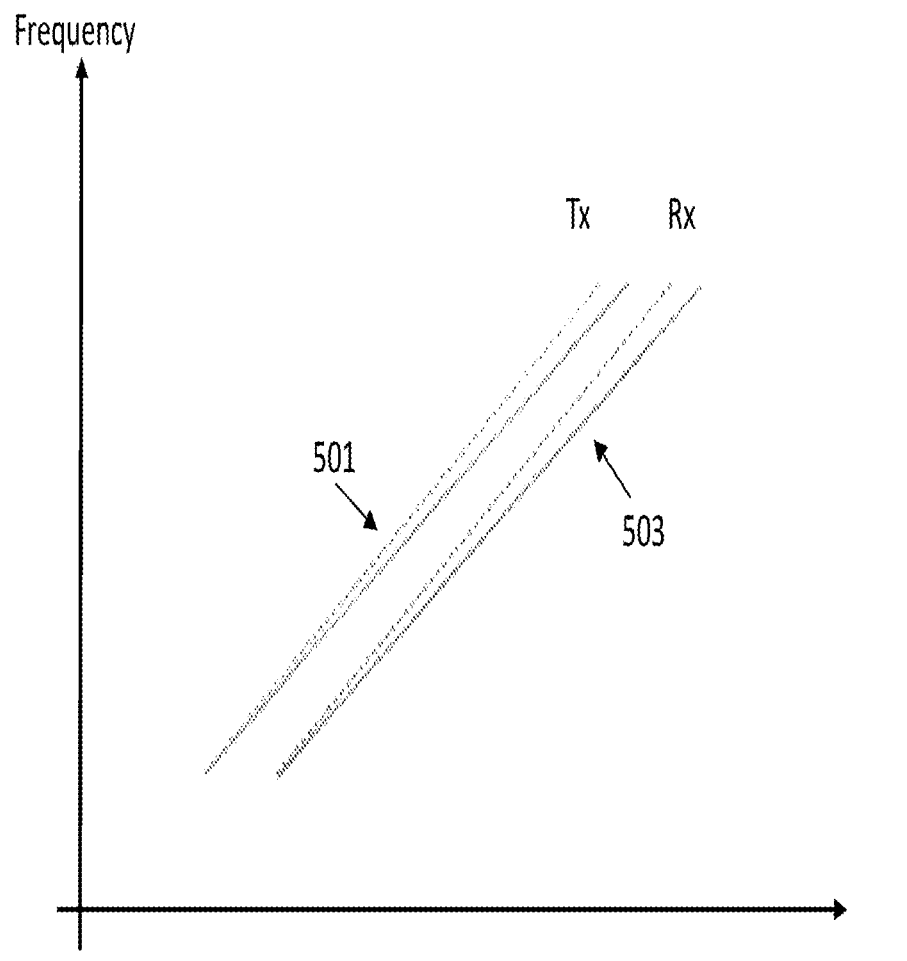
FIG. 5 illustrates various chirp rate offsets that can be detected by embodiments of the present disclosure.

FIG. 5 illustrates various chirp rate offsets that can be detected by embodiments of the present invention. The variations in the scanning signal Tx are shown at 501, and the variations in the return signal Rx are shown at 503, in this example embodiment. As shown in FIG. 5, among other things, offsets caused by laser calibration and/or degradation of components over time can be detected by LIDAR systems described by embodiments of the present invention using components such as those depicted in FIG. 1.

Figure 6:
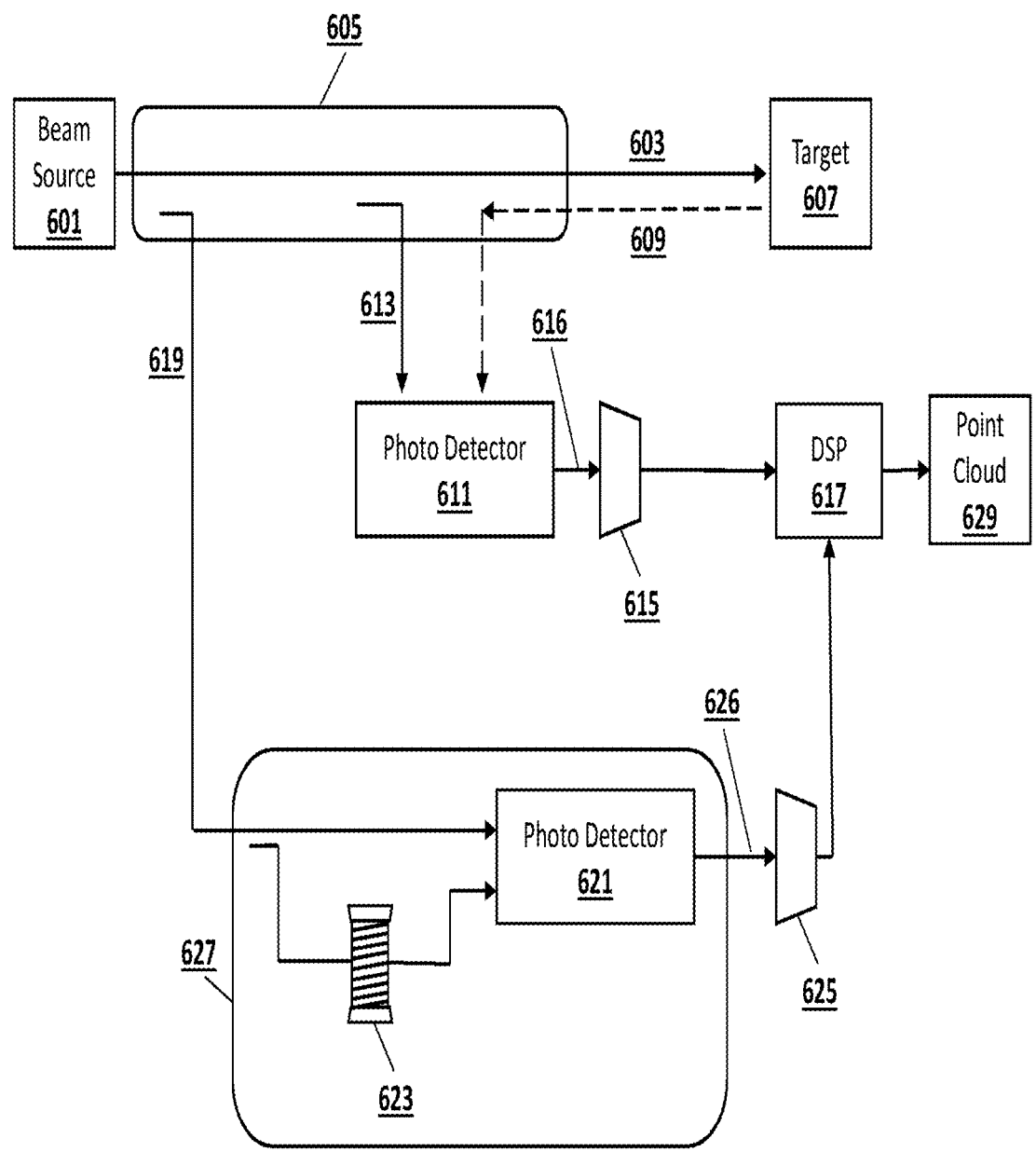
FIG. 6 is a block diagram of an example LIDAR system with a reference arm, according to embodiments of the present disclosure.

FIG. 6 is a block diagram of an example LIDAR system with a reference arm 627, according to embodiments of the present disclosure. As shown in FIG. 6, according to some embodiments, one or more reference arms 627 can be added to a LIDAR system to generate a digitally sampled reference signal 626 that can be used to estimate the phase impairment in the transmitted signals described herein. In this fashion, reference arm 627 creates a digitally sampled reference signal 626 corresponding to a target (e.g., target 607) at a known delay with a phase impairment similar to that on the received signal from the target. The digitally sampled reference signal 626 can be used to estimate the phase impairment for subsequent correction. For instance, in one example embodiment, the system includes a beam source 601, such as a FMCW laser source. The target arm 605 includes a number of optical components (e.g. lenses or filters) through which the scanning signal 603 can pass on its way to a target 607. The return signal 609 can be reflected from the target 607 and directed to a photo detector 611. In this embodiment, a local oscillator (LO) signal 613, which is a portion of the scanning signal 603, is directed to the photo detector 611 before being sent out to the target 607. From the photo detector 611, a digitally sampled target signal 616 then passes to a target ADC 615, and then to the DSP 617.

As depicted in this embodiment, the reference arm 627 receives a signal portion 619 of the scanning signal 603, which can be provided to a photo detector 621 directly, and also after passing through a delay device 623 having a known length and/or delay. According to some embodiments, signal portion 619 is received by photo detector 621 as scanning signal 603 is transmitted contemporaneously through the optical components of target arm 605. According to some embodiments, signal portion 619 is received by photo detector 621 after scanning signal 603 is transmitted through the optical components of target arm 605. According to some embodiments, delay device 623 can be a fiber delay device, etc. In one embodiment, the delay device 623 can include a fiber coil with a known length that can create a virtual target (e.g., fiber target) at a known distance.

In some scenarios, the virtual target's distance can be pre-determined. The optical signal at the output of the reference delay has the same characteristics as the target return signal 202 depicted in FIG. 2. According to some embodiments, in a manner similar to that described in FIG. 2, virtual targets described herein can produce a return signal 609 that is a time-delayed version of scanning signal 603.

When the return signal 609 is optically mixed with scanning signal 603, a reference range dependent difference frequency ("reference beat frequency") is generated. According to some embodiments, the reference beat frequency can then be digitized and conditioned using the procedures described herein, for example, in FIG. 1. This digitally sampled reference signal 626 has the same signature of phase impairment as the received signal from the target. A phase impairment estimator, based at least in part on the digitally sampled reference signal 626 produced by reference arm 627 and a phase impairments corrector (discussed in greater detail below) described by embodiments of the present disclosure, can compensate for phase impairments in signals transmitted towards a target (i.e., "target" signals) and signals received therefrom (i.e., "received" signals).

From the photo detector 621, the reference arm signal 626 then passes to a reference ADC 625 and then to the DSP 617. As shown in FIG. 6, embodiments of the present invention can produce point cloud data 629 based on the transmission and receipt of various signals, including the return signal 609, a LO signal 613, the digitally sampled target signal 616, and the digitally sampled reference signal 626.

As discussed above, the phase impairments on the digitally sampled target signal 616 include two components: impairments introduced from the LO signal 613, and impairments introduced by the return signal 609. Both of these impairments are corrected for in various ways by embodiments described herein, as discussed in more detail below. For instance, FIG. 14 describes a technique for correcting both types of phase impairments, while FIGS. 7-8 describe techniques for correcting phase impairments introduced from the LO signal 613 and FIGS. 9-12 describe techniques for correcting phase impairments introduced from the return signal 609 in accordance with embodiments of the present disclosure.

Figure 7:
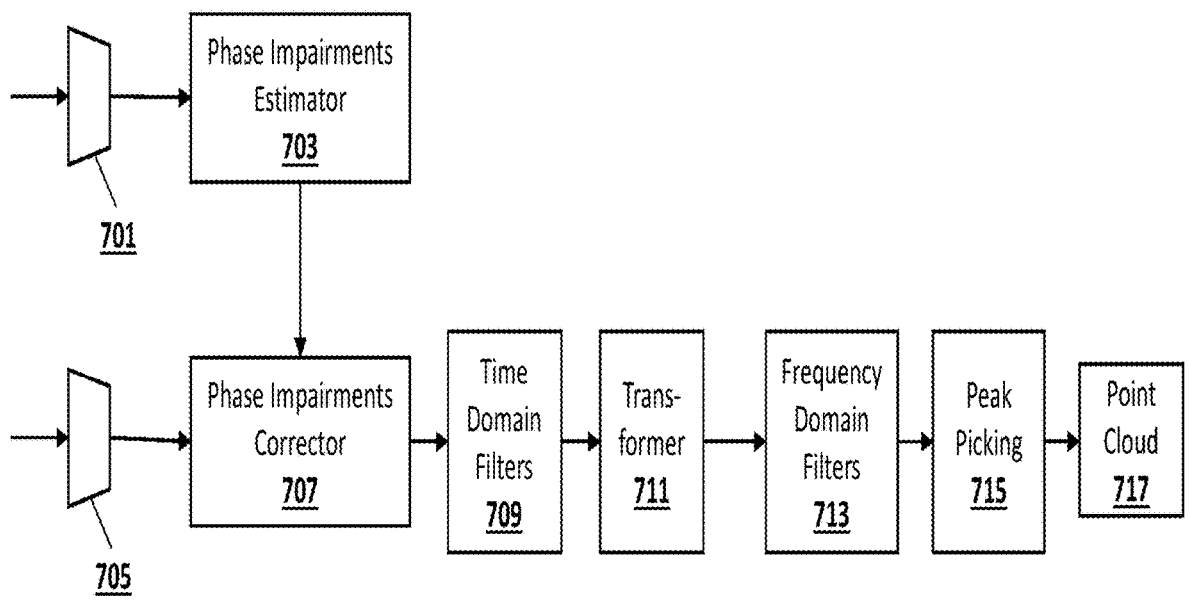
FIG. 7 depicts a digital signal processing architecture, according to embodiments of the present disclosure.

FIG. 7 depicts a digital signal processing architecture according to embodiments of the present invention. In one embodiment, signal processing architecture described in FIG. 7 can correspond to components within the signal processor 112 shown in FIG. 1. As shown in FIG. 7, according to some embodiments, the digital signal processing architecture includes a phase impairments estimator 703 and a phase impairments corrector 707, along with one or more reference ADCs 701 and target ADCs 705. As shown in FIG. 7, the digital signal processing architecture also includes time domain filters 709, time to frequency domain transformer 711 (e.g. FFT), frequency domain filters 713, and peak picking components 715. Phase impairments processed by this architecture include various phase impairments, including those previously mentioned above. As depicted in FIG. 7, according to some embodiments, the digital signal processing architecture can generate and process data such as point cloud data 717. As depicted in FIG. 7, in some scenarios, corrections can be performed before one or more digital signal processor procedures are performed, such as those performed by time domain filters 709, time to frequency domain transformer 711, frequency domain filters 713, and peak picking components 715.

According to some embodiments, the phase impairments estimator 703 can use several different approaches to estimate the phase impairments. For instance, in some embodiments, the phase impairments estimator 703 can use "zero-forcing" estimation in which a reference phase is run through a filter with a frequency response equal to the inverse frequency response of the reference arm described by the embodiments. In some embodiments, the phase impairments estimator 703 can use minimum mean-squared estimation (MMSE) in which noise enhancements caused due to zero-forcing estimation can be mitigated, around frequencies where the frequency response of the reference arm is generally weaker. In some embodiments, the phase impairments estimator 703 can use a maximum likelihood/MAP estimation which can be based, at least in part, on statistical data related to phase impairments collected over periods of time.

According to some embodiments, the phase impairments corrector 707 can use several different approaches to correct the phase impairments in the return signal. The phase impairment in the return signal is composed of impairments introduced from the LO signal as well as the return signal. For instance, in some embodiments, the phase impairments corrector 707 can compensate for phase impairment components introduced due to the LO signal as well as the return signal paths, which will be described in greater detail below.

Figure 8:
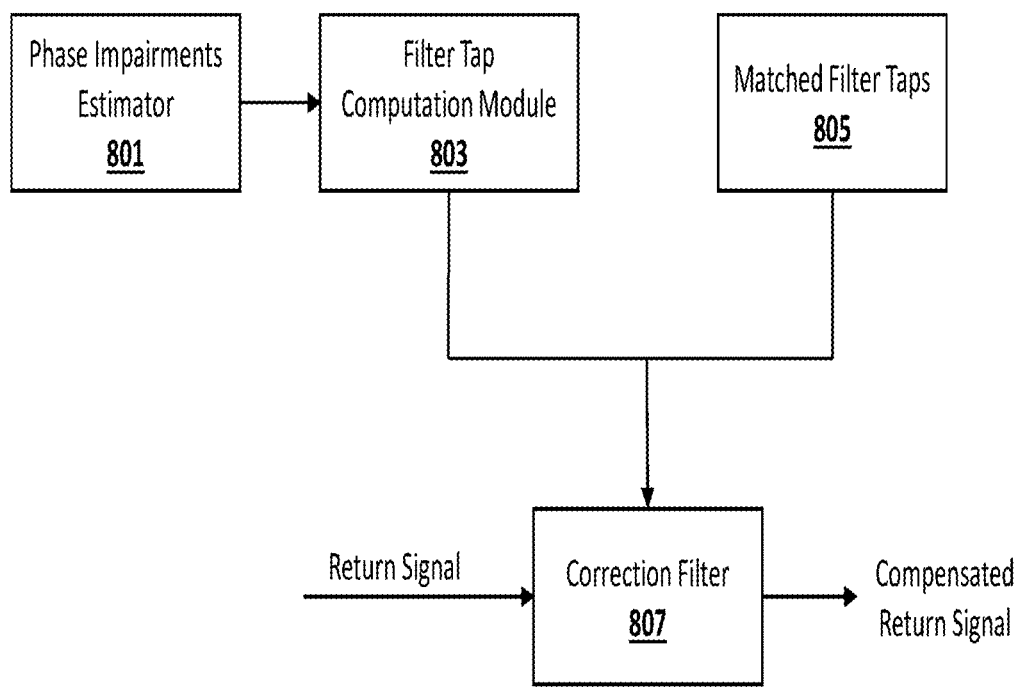
FIG. 8 depicts an example system for correcting impairments from a return signal, according to some embodiments of the present disclosure.

FIG. 8 depicts an example system for correcting impairments introduced from the LO signal, according to some embodiments of the present disclosure. In some embodiments, a phase impairments estimator 801 can estimate phase impairments, as disclosed herein, and these impairments can be corrected using a correction filter 807 with filter taps shaped based on the estimated phase impairment. In one embodiment, the shape of the filter taps can be computed using a filter tap computation module 803 based on the phase impairments estimator 801.

In some embodiments, the filter taps can be shaped to cancel or equalize the phase noise impairment and/or mitigate noise enhancement due to estimation inaccuracies. In some scenarios, if an instantaneous estimate of phase impairment is not available, embodiments can utilize matched filter taps 805 that are shaped according to an average power spectral density (PSD) of the phase impairment. In some scenarios, if an instantaneous estimate of phase impairment is not available, embodiments can use a matched filter for correction which can have different taps and/or shapes at different frequencies to account for variations in phase impairment bandwidth across frequencies.

In some embodiments, the correction filter 807 can receive the return signal, as well as inputs provided by the filter tap computation module 803 computed by the phase impairments estimator 801, and/or matched filter taps 805 matched to an average PSD. Based on these inputs, the correction filter 807 can produce a compensated return signal.

According to some embodiments, the systems and components described herein can correct impairments on the return signal introduced from the receive signal from the target. In some scenarios, the receive signal can have a delay equal to a target delay. In some embodiments, correcting for phase impairments from the receive signal includes compensating for delays before running a correction filter. Approaches used by various embodiments can include, but are not limited to, brute-force delayed correction filters using multiple delays, iterative delayed correction filters, and deskew compensated correction filters. In one embodiment, the phase impairments estimator 801 and filter tap computation module can correspond to components within the signal processor 112 described in FIG. 1, while the matched filter taps 805 and correction filter 807 can correspond to components within the optical circuits 101 in FIG. 1.

Figure 9:
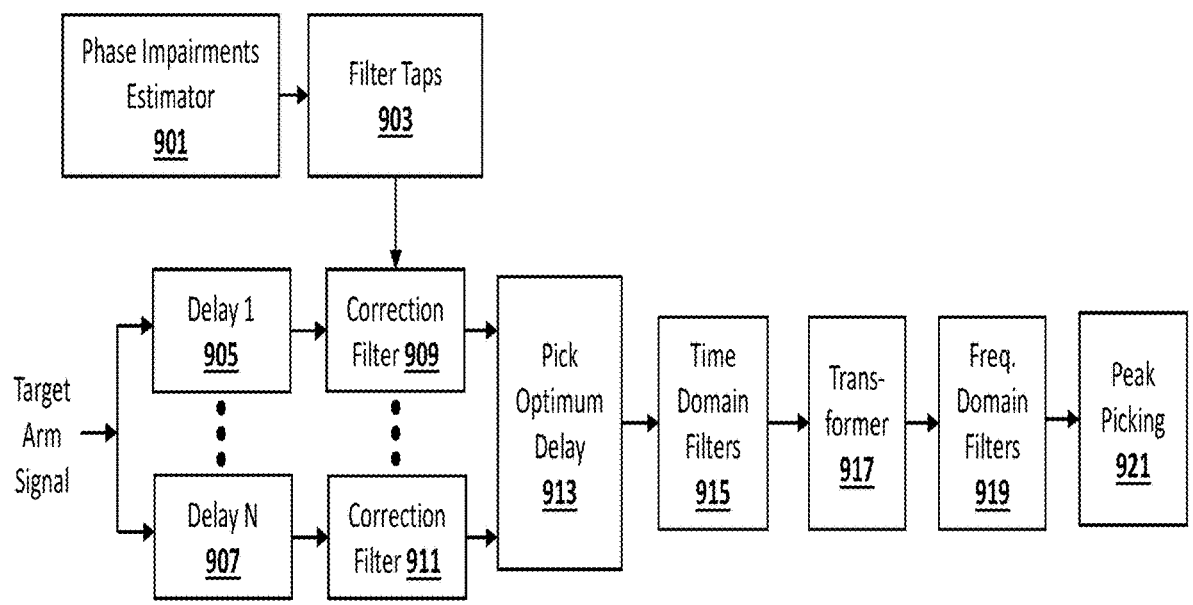
FIG. 9 depicts an example system for correcting phase impairments using multiple delays, according to some embodiments of the present disclosure.

FIG. 9 depicts an example system for correcting phase impairments using multiple delays, according to some embodiments of the present disclosure. In some embodiments, phase impairments correctors can be configured with a brute-force delayed correction filter that can delay a received optical beam through a number of digital delays and select an optimal delay. Selecting the optimal delay can include, for example, performing a FFT of the digital delays and selecting the delay with the highest peak. As illustrated in FIG. 9, this technique can involve the use of, but not limited to, a phase impairments estimator 901, computed filter taps 903, one or more correction filters 909-911, time domain filters 915, time to frequency domain transformer 917 (e.g. FFT), frequency domain filters 919, and peak picking components 921.

In some embodiments, the target arm signal is sent through N different delays 905-907, and a correction filter 909-911 can be applied for each of the possible target delays 905-907. Once the multiple delays have been applied to the target arm signal, the optimal delay can be picked 913. In some embodiments, the best match can be defined based on, for example but not limited to, a strongest peak, higher SNR, or other metrics that are used for signal detection. In one embodiment, picking the optimum delay includes performing a fast Fourier transform (FFT) of the plurality of delayed optical beams and selecting a delay with a highest peak. In one embodiment, the components described in FIG. 9 can correspond to components within the signal processor 112 or the optical circuits 101 described in FIG. 1.

Figure 10:
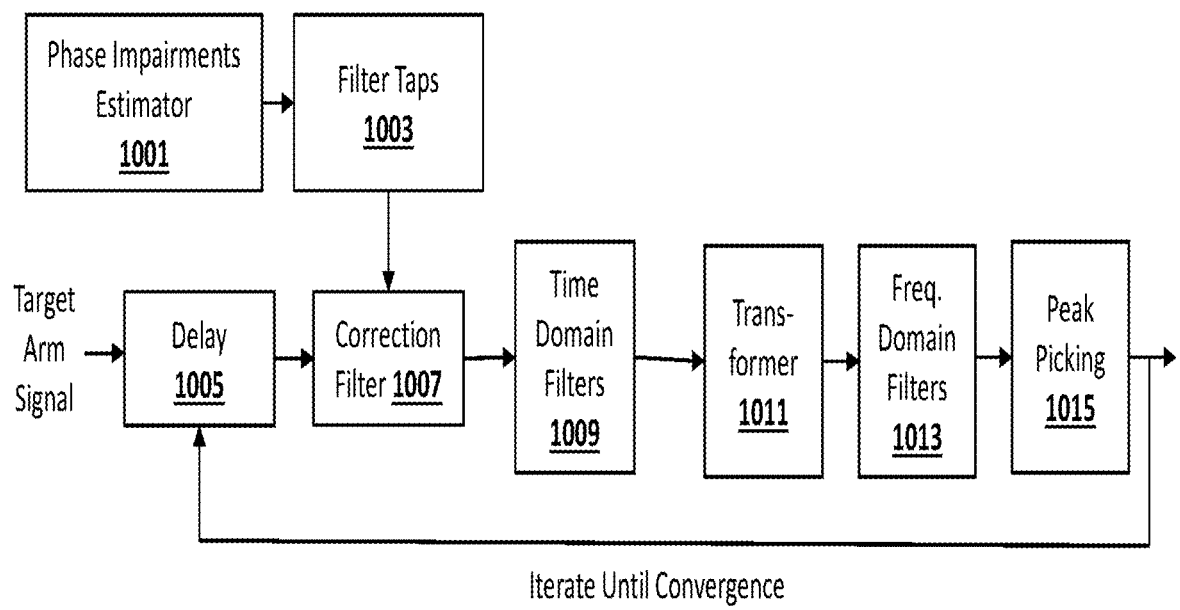
FIG. 10 depicts an example system for correcting phase impairments using an iterative delayed correction filter, according to some embodiments of the present disclosure.

FIG. 10 depicts an example system for correcting phase impairments using an iterative delayed correction filter, according to some embodiments of the present disclosure As illustrated in FIG. 10, this technique can involve the use of, but not limited to, a phase impairments estimator 1001, computed filter taps 1003, one or more correction filters 1007, time domain filters 1009, time to frequency domain transformer 1011 (e.g. FFT), frequency domain filters 1013, and peak picking components 1015. In some embodiments, the target arm signal can be passed through a delay 1005, and then through the correction filter 1007 and other signal processing components. After peak picking 1015, the signal can be returned to the delay 1005 and the process iterated between an optimal delay and a peak frequency until convergence is achieved. In some embodiments, the initialization for the delay 1005 can be based on, for example, neighboring points in a current frame, and/or points from a previous frame. In one embodiment, the components described in FIG. 10 can correspond to components within the signal processor 112 or the optical circuits 101 described in FIG. 1.

Figure 11:
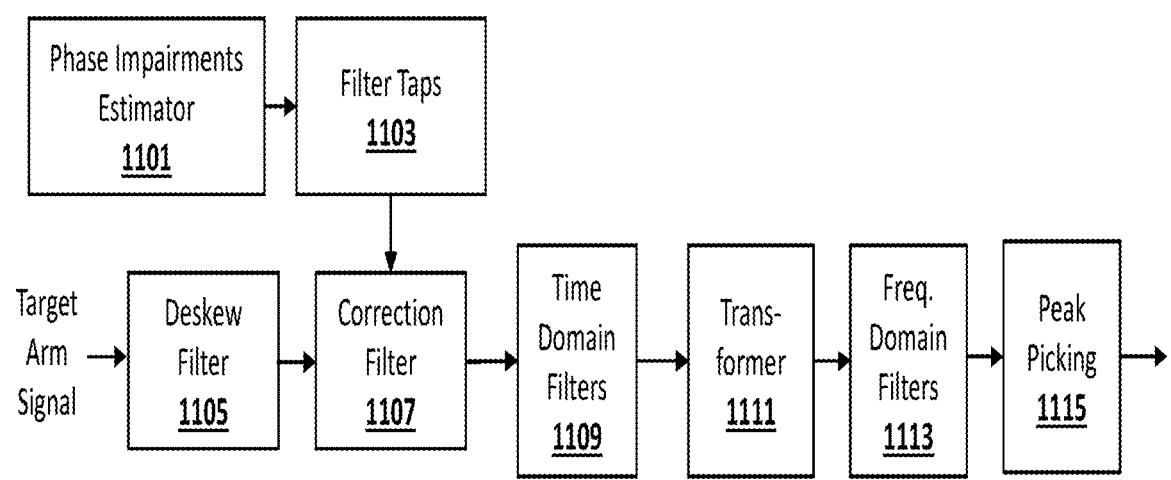
FIG. 11 depicts an example system for correcting phase impairments using a deskew compensated correction filter, according to some embodiments of the present disclosure.

FIG. 11 depicts an example system for correcting phase impairments using a deskew compensated correction filter, according to some embodiments of the present disclosure. As illustrated in FIG. 11, this technique can involve the use of, but not limited to, a phase impairments estimator 1101, computed filter taps 1103, one or more correction filters 1107, time domain filters 1109, time to frequency domain transformer 1111 (e.g. FFT), frequency domain filters 1113, and peak picking components 1115. In some embodiments, the target arm signal can be passed through a deskew filter 1105 in order to apply a different delay based on the frequency of the signal. Embodiments can utilize the fact that the frequency of a peak is linearly related to a delay.

In some embodiments, a deskew filter 1105 can shift a phase impairment estimate based on the frequency of the peak. In some embodiments, deskew filters 1105 can be used to apply a group delay to the signal, which can be proportional to the frequency content of the target arm signal. In some embodiments, one or more deskew filters can be used to apply the correct group delay when there is no Doppler shift on the return signal (Rx). In scenarios where there is a Doppler shift, some embodiments of the present disclosure can detect a loss in performance due to the Doppler shift. In one embodiment, the components described in FIG. 11 can correspond to components within the signal processor 112 or the optical circuits 101 described in FIG. 1.

Figure 12:
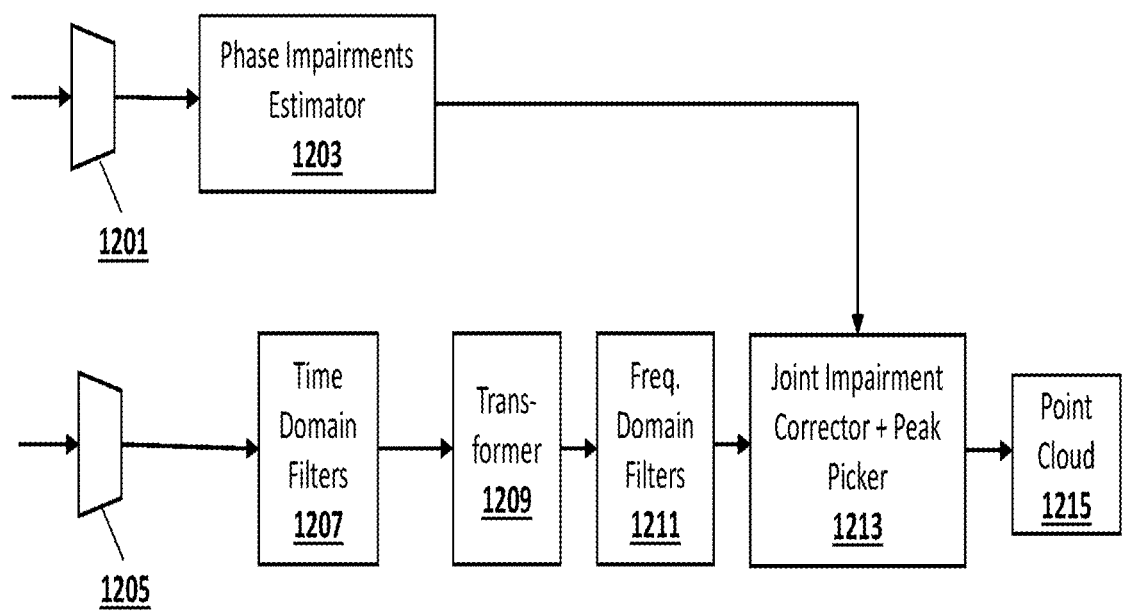
FIG. 12 depicts an example system for correcting phase impairments using a combined impairment corrector and peak picker, according to some embodiments of the present disclosure.

FIG. 12 depicts an example system for correcting phase impairments using a combined impairment corrector and peak picker 1213, according to some embodiments of the present disclosure. As illustrated in FIG. 12, this technique can involve the use of, but not limited to, a phase impairments estimator 1203, joint impairment corrector and peak picker 1213, time domain filters 1207, time to frequency domain transformer 1209 (e.g. FFT), frequency domain filters 1211, along with one or more reference ADCs 1201 and target ADCs 1205. Embodiments of the present invention can produce point cloud data 1215 from these described architectures. In some embodiments, rather than correcting for phase impairments up-front, the phase impairment corrector can be integrated as part of the peak picker to achieve a joint optimal estimate of a peak. In one embodiment, the components described in FIG. 12 can correspond to components within the signal processor 112 or the optical circuits 101 described in FIG. 1.

Figure 13:
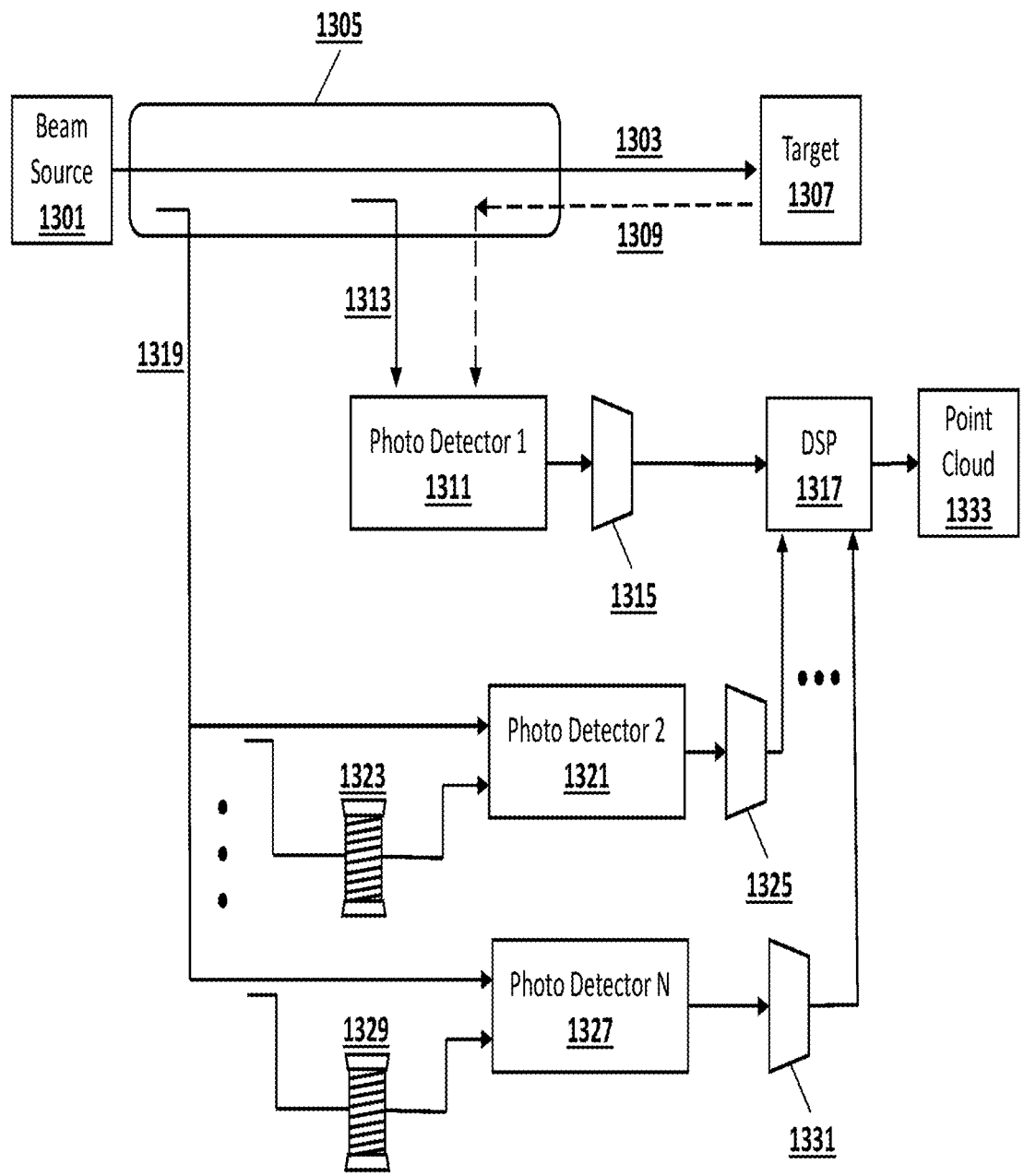
FIG. 13 an example system for correcting phase impairments using multiple reference channels, according to some embodiments of the present disclosure.

FIG. 13 an example system for correcting phase impairments using multiple reference channels, according to some embodiments of the present disclosure. As shown in FIG. 13, the LIDAR system includes a beam source 1301, such as a FMWC laser source. The target arm includes a number of optical components 1305 through which the scanning signal 1303 can pass on its way to a target 1307. The return signal 1309 can be reflected from the target 1307 and directed to a photo detector 1311. In this embodiment, a LO signal 1313 is directed to the photo detector 1311 before being sent to the target 1307. From the photo detector 1311, the target arm signal then passes to a target ADC 1315, and then to the DSP 1317.

In the embodiment shown in FIG. 13, a portion 1319 of the scanning signal 1303 is diverted to multiple reference arms. In some embodiments, each of the reference arms can include a photo detector and a fiber delay having a known length. For example, a reference arm can include the photo detector 1321, a fiber delay 1323, and a reference ADC 1325. Similarly, the Nth reference arm can include its own photo detector 1327, fiber delay 1329, and ADC 1331.

In some embodiments, multiple reference channels can be added with different reference arm delays to improve an estimate of a phase impairment. In some embodiments, the system can produce point cloud data 1333 based on the transmission and receipt of various signals, including those from a target environment and LO signals. In one embodiment, the components described in FIG. 9 can correspond to components within the signal processor 112 or the optical circuits 101 described in FIG. 1.

Figure 14:
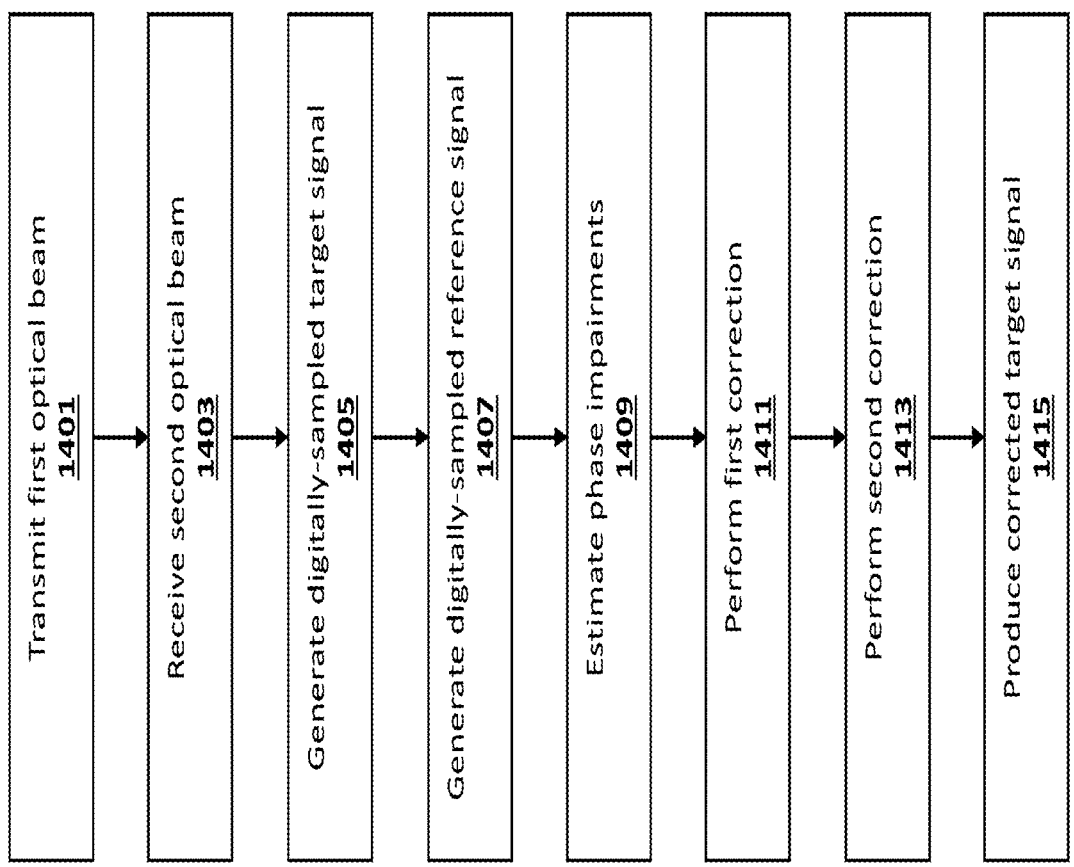
FIG. 14 is a flow diagram of an example method to compensate for phase impairments within a LIDAR system, according to an embodiment of the present disclosure.

FIG. 14 is a flow diagram of an example method to compensate for phase impairments within a LIDAR system, according to an embodiment of the present disclosure. The method begins at operation 1401 by transmitting an optical beam to a target. The optical beam can include, for example, a FMWC beam.

At operation 1403, a reflected optical beam is received from the target to produce a received optical beam.

At operation 1405, a digitally sampled target signal is generated using a LO beam, a photo detector, and the received optical beam.

At operation 1407, a digitally sampled reference signal is generated using a reference beam transmitted through a fiber delay device and a photo detector. In some embodiments, a number of digitally sampled reference signals are generated using reference beams transmitted through multiple different fiber delay devices. Each fiber delay device can be connected with a respective photo-detector, in some embodiments. In some embodiments, the fiber delay device generates delay proportional to a frequency of the received optical beam such that reflections from targets at a larger distance are delayed more and reflections from targets at a shorter distance are delayed less.

At operation 1409, one or more phase impairments in the LIDAR system are estimated using the digitally sampled reference signal. This produces one or more estimated phase impairments. In some embodiments, estimating the phase impairments includes using a zero forcing estimator, a MMSE estimator, a maximum likelihood estimator, or a map estimator.

At operation 1411, a first correction is performed. This first correction is performed on a first phase impairment corresponding to the LO beam. In other words, the first correction corrects for phase impairments introduced into the digitally sampled target signal from the LO beam. In some embodiments, performing the first correction includes using one or more filters shaped based at least in part on an estimation of the first phase impairment. The filters can be, for example, the matched filter taps discussed above.

At operation 1413, a second correction is performed. This second correction is performed on a second phase impairment corresponding to the received optical beam. In other words, the second correction corrects for phase impairments introduced into the digitally sampled target signal from the received optical beam. In some embodiments, performing the second correction can include using a brute force delayed correction filter that delays the received optical beam through a number of digital delays and selects an optimal delay. The optimal delay can be selected by performing a fast Fourier transform (FFT) of the digital delays and selecting a delay with a highest peak, in some embodiments. In alterative embodiments, the second correction can include using an iterative delayed correction filter that repeatedly delays the reflected optical beam through different digital delays until peak convergence is achieved. In still other embodiments, the second correction can include using a deskew compensation correction filter.

At operation 1415, a corrected target signal is produced by processing the first and second corrections. Once a corrected target signal is produced, it can be transmitted to a point cloud.

The various operations and methods described in the present application can be performed, in some embodiments, using the signal processing unit 112, signal conversion unit 106, or the signal conditioning unit 107 described above in FIG. 1. The various optical components, fiber delays, and other structural components can be implemented as the optical circuits 101 described in FIG. 1.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

The term "coupled," along with its derivatives, is used to indicate that two or more elements interact with each other. These coupled elements may or may not be in direct physical or electrical contact with each other.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method to correct phase impairments in a light detection and ranging (LIDAR) system, the method comprising:

generating a digitally-sampled target signal using a local oscillator (LO) beam, a first photo-detector and an optical beam received from a target;

generating a digitally-sampled reference signal using a reference beam transmitted through a fiber delay device and a second photo-detector;

estimating one or more phase impairments in the LiDAR system using the digitally-sampled reference signal to produce one or more estimated phase impairments, wherein the one or more phase impairments include variations in phase over time;

performing one or more corrections on the one or more phase impairments in the digitally-sampled target signal; and processing the one or more corrections to produce a corrected target signal for transmission to a point cloud.

2. The method of claim 1, wherein estimating the one or more phase impairments includes:
using at least one of a zero forcing estimator, a MMSE estimator, a maximum likelihood estimator, and a map estimator.

3. The method of claim 1, wherein performing the one or more corrections comprises:
using one or more filters shaped based at least in part on an estimation of the one or more phase impairments.

4. The method of claim 1, wherein performing the one or more corrections comprises:
using a brute force delayed correction filter that delays the optical beam received from the target through a plurality of digital delays and selects an optimal delay.

5. The method of claim 4, wherein selecting the optimal delay comprises:
performing a fast Fourier transform (FFT) of the plurality of digital delays and selecting a delay with a highest peak.

6. The method of claim 1, wherein performing the second correction comprises:
using an iterative delayed correction filter that repeatedly delays the optical beam received from the target through different digital delays until peak convergence is achieved.

7. The method of claim 1, wherein performing the second correction comprises:
using a deskew compensation correction filter.

8. The method of claim 1, further comprising:
generating a plurality of digitally-sampled reference signals using reference beams transmitted through multiple different fiber delay devices, wherein each fiber delay device is connected with a respective photodetector.

9. A light detection and ranging (LIDAR) system comprising:
a first detector to receive an optical beam received from the target and a local oscillator (LO) beam and generate a digitally-sampled target signal;
a fiber delay device having a known length and coupled to the optical beam source;
a second detector coupled to the fiber delay device to generate a digitally-sampled reference signal using a reference beam transmitted through the fiber delay device; and
circuitry coupled with memory and including instructions which, when executed, cause the circuitry to:
estimate one or more phase impairments in the LiDAR system using the digitally-sampled reference signal to produce one or more estimated phase impairments, wherein the one or more phase impairments include variations in phase over time;
correct for the one or more phase impairments in the LiDAR system to produce one or more corrected signals; and
calculate at least one of a range and a velocity of a target based on the corrected signals.

10. The system of claim 9, further comprising at least one of a zero forcing estimator, a MMSE estimator, a maximum likelihood estimator, and a map estimator to estimate the one or more phase impairments.

11. The system of claim 9, wherein the phase impairment corrector includes one or more filters shaped based at least in part on an estimation of the one or more phase impairments.

12. The system of claim 9, wherein the phase impairment corrector includes a brute force delayed correction filter that delays the optical beam received from the target through a plurality of digital delays and selects an optimal delay.

13. The system of claim 12, wherein selecting the optimal delay comprises:
performing a fast Fourier transform (FFT) of the plurality of digital delays and selecting a delay with a highest peak.

14. The system of claim 9, wherein the phase impairment corrector includes an iterative delayed correction filter that repeatedly delays the optical beam received from the target through different digital delays until peak convergence is achieved.

15. The system of claim 9, wherein the phase impairment corrector includes a deskew compensation correction filter.

16. The system of claim 9, wherein the fiber delay device generates delay proportional to a frequency of the optical beam received from the target such that reflections from targets at a larger distance are delayed more and reflections from targets at a shorter distance are delayed less.

17. The system of claim 9, further comprising:
a plurality of different fiber delay devices and photodetectors to generate a plurality of digitally-sampled reference signals.

18. A light detection and ranging (LIDAR) system comprising:
a first detector to receive an optical beam received from a target and a local oscillator (LO) beam and generate a digitally-sampled target signal;
a fiber delay device having a known length and coupled to an optical beam source;
a second detector coupled to the fiber delay device to generate a digitally-sampled reference signal using a reference beam transmitted through the fiber delay device; and
a processing device coupled with memory and including instructions which, when executed, cause the processing device to:
estimate one or more phase impairments in the LIDAR system using the digitally-sampled reference signal to produce one or more estimated phase impairments, wherein the one or more phase impairments include variations in phase over time;
correct for the one or more phase impairments in the LIDAR system to produce one or more corrected signals; and
calculate at least one of a range and a velocity of a target based on the corrected signals.

19. The method of claim 18, wherein estimating the one or more phase impairments includes:
using at least one of a zero forcing estimator, a MMSE estimator, a maximum likelihood estimator, and a map estimator.

20. The method of claim 18, wherein correcting for the one or more phase impairments comprises:
using a brute force delayed correction filter that delays the optical beam received from the target through a plurality of digital delays and selects an optimal delay;
using an iterative delayed correction filter that repeatedly delays the optical beam received from the target through different digital delays until peak convergence is achieved; or
using a deskew compensation correction filter.

* * * * *